J. J. BATE.
Rendering Apparatus.
No. 20,856.
Patented July 13, 1858.
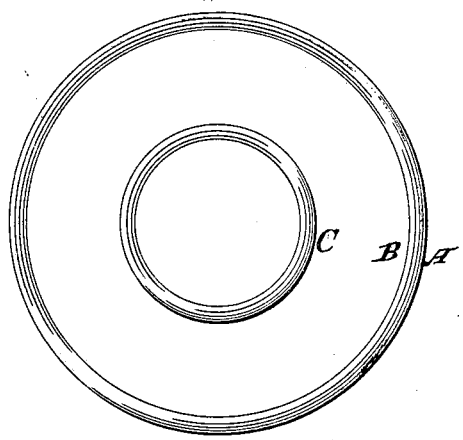
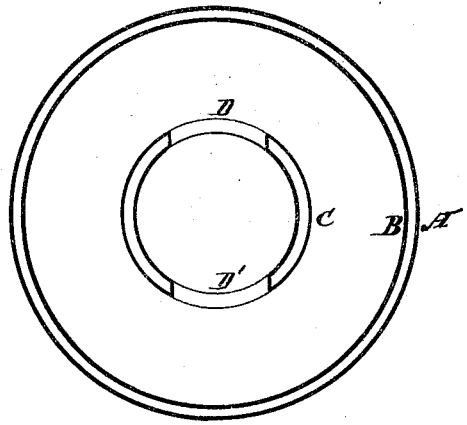
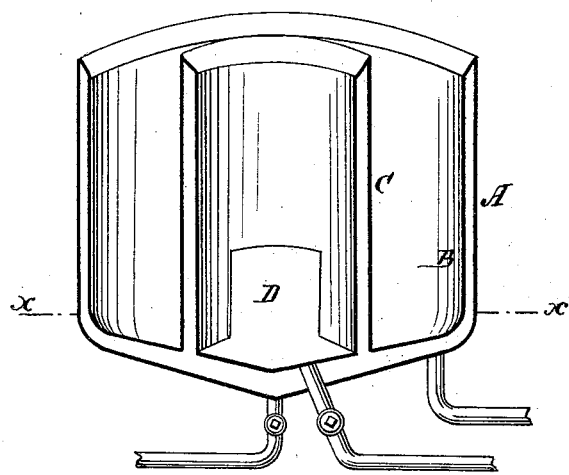

UNITED STATES PATENT OFFICE.

JNO. J. BATE, OF BROOKLYN, NEW YORK.

KETTLE FOR RENDERING LARD.

Specification of Letters Patent No. 20,856, dated July 13, 1858.

*To all whom it may concern:*

Be it known that I, JOHN J. BATE, of the city of Brooklyn, in the county of Kings and State of New York, have invented certain new and useful Improvements in Steam-Heated Kettles for Rendering or Trying Lard and other Fatty Substances; and I do hereby declare that the following is a full and exact description of the same, reference being had to the accompanying drawings, and to the letters of reference marked thereon, in which—

Figure 1 is a vertical section of a kettle with my improvements. Fig. 2 is a plan view of the same, and Fig. 3 a horizontal section through the line $x\ x$ Fig. 1.

The object of my invention is to provide means by which a passage is made from the exterior to the interior of the central heater of a double steam kettle, so that the contents of the kettle and heater can communicate with each other for the more ready clearance of the contents of the heater and for the purpose of expediting the process of rendering.

A is the jacket or shell of the kettle.

B is the kettle, made enough smaller in diameter and less in height than the jacket to form a space between the two when put together to admit the steam from the boiler attached to the kettle to circulate between the kettle and shell to heat the kettle, and which is secured to the jacket at the top so as to form a steam tight joint.

C is a cylindrical heater, placed centrally in the kettle B and connected to it at its lower end, which is heated by the steam entering the space between its exterior and interior shells, and which serves to convey the heat to the central part of the contents of the kettle to expedite the melting or rendering of them. As the contents of this heater and those of the kettle would be kept separate if there were no means of communication between the exterior and interior of the heater, and as they would be difficult to be got at for the purpose of removal after they were melted, the bottom part of the heater is cut through in the manner shown by the openings D, D' to form apertures by which this communication and connection is made, and through which the contents of the heater can flow out into the kettle to be discharged, and which serve to expedite the rendering process by the melted lard or other substance of the one compartment of the apparatus being allowed to flow to, and act upon the contents of the other.

The apparatus is heated by steam, and the condensed water taken off from it in the usual manner, and it is charged with material and its contents are drawn off after being melted as in other steam heated kettles in common use.

What I claim as my invention and desire to secure by Letters Patent is—

Providing a means of communication between the exterior and interior of the heater C by the apertures D, D', so that the contents of the kettle and the heater can communicate with each other, as, and for the purposes set forth.

JOHN J. BATE.

Witnesses:
   FRANCIS S. LOW,
   EPES E. ELLERY.